United States Patent [19]
Venkataramani et al.

[11] Patent Number: 5,898,180
[45] Date of Patent: Apr. 27, 1999

[54] INFRARED ENERGY REFLECTING COMPOSITION AND METHOD OF MANUFACTURE

[75] Inventors: Venkat Subramaniam Venkataramani, Clifton Park, N.Y.; Douglas Dwight Giese, Louisville, Ky.

[73] Assignee: General Electric Company, Schenectady, N.Y.

[21] Appl. No.: 08/862,886

[22] Filed: May 23, 1997

[51] Int. Cl.⁶ .................................................. F28D 21/00
[52] U.S. Cl. ...................................................... 250/504 R
[58] Field of Search ............................ 250/504 R, 505.1, 250/493.1, 495.1; 427/167; 428/336; 359/589; 219/405, 411

[56] References Cited

U.S. PATENT DOCUMENTS

| | | | |
|---|---|---|---|
| 2,767,297 | 10/1956 | Benson | 219/35 |
| 3,304,406 | 2/1967 | King | 219/411 |
| 3,436,524 | 4/1969 | Pauls | 219/347 |
| 3,612,828 | 10/1971 | Siegla | 219/464 |
| 3,718,497 | 2/1973 | Rice | 117/35 R |
| 4,188,452 | 2/1980 | Groth | 428/336 |
| 4,345,143 | 8/1982 | Craig et al. | 219/411 |
| 4,455,479 | 6/1984 | Itoh et al. | 219/405 |
| 5,028,760 | 7/1991 | Okuyama | 392/435 |
| 5,058,196 | 10/1991 | Nakamura et al. | 392/435 |
| 5,270,550 | 12/1993 | Martorana et al. | 250/504 R |
| 5,276,763 | 1/1994 | Gobel et al. | 392/422 |
| 5,517,005 | 5/1996 | Westerberg et al. | 219/685 |

FOREIGN PATENT DOCUMENTS

| | | |
|---|---|---|
| 2175201 | 10/1973 | France . |
| 2367711 | 5/1978 | France . |
| 4126790 | 2/1993 | Germany . |
| 55-007586 | 1/1980 | Japan . |
| 59-173272 | 1/1984 | Japan . |
| 63-117928 | 5/1988 | Japan . |

*Primary Examiner*—Kiet T. Nguyen
*Attorney, Agent, or Firm*—Ernest G. Cusick; Noreen C. Johnson

[57] ABSTRACT

An infrared energy cooking and heating apparatus comprises an infrared layer or reflective coating, particularly on inner panels of ovens or other cooking devices. The coating is preferably an enamel and reflects the infrared energy to the food being cooked and heated. In particular, the infrared cooking apparatus are substantially faster than such processes in conventional ovens, and offer improvements in foodstuff cooking times. The enamel comprises metal oxide particles that enhance the infrared energy reflectivity of the enamel. Further, the metal oxide particles in the enamel can be formed in several ways so as to enhance the reflectivity.

32 Claims, 5 Drawing Sheets fig. 1 fig. 2 fig. 3 fig. 4 fig. 5 fig. 6

INFRARED ENERGY REFLECTING COMPOSITION AND METHOD OF MANUFACTURE

BACKGROUND OF THE INVENTION

1. Field of the Invention

This invention relates to enhanced reflectance infrared energy reflecting compositions for cooking apparatus.

2. Description of the Related Art

Ovens for cooking food have been known and used for thousands of years. One of the simplest and probably the oldest cooking of food resulted when food products were left next to a fire, perhaps on a hot rock, and cooked essentially by a heat transfer method of conduction. With refinement, an enclosure surrounding the heating element entrapped the heated air, giving rise to cooking by convective heat transfer. This process was the prototype for the modern gas or electric oven.

In the past century, radiant energy from energy radiation sources has been used to heat and directly cook foodstuffs. Within the past few decades, microwave ovens have become common, in which microwave radiation cooks the food. This has proved useful in allowing very short cooking times for many types of food.

Ovens using infrared energy sources, for example such as quartz halogen lamps, are used for quick heating of food. These quartz halogen lamp ovens can also be used for cooking, and are common in restaurants. In these ovens most of the heat is infrared energy. This infrared energy is reflected and a majority of the infrared energy is lost into the walls of the oven. The walls of these ovens do not reflect a sufficient amount of infrared energy cooking energy onto the food to be cooked to be an efficient user of energy.

Attempts have been made to line the inside of the quartz halogen lamp ovens with metallized coatings, which are often highly polished coatings. However, the highly polished surfaces cannot withstand the scrubbing and cleaning processes and materials to which ovens are subjected. The cleaning leads to a degradation of the polished metallized coating, and a subsequent reduction in the reflective efficiency of the oven.

Further, the metal reflective surfaces provide only a specular reflectance, and do not efficiently disperse and direct the infrared energy to the food to be heated. The specular reflectance by metallic surfaces provides a direct, "angle in equals angle out" type of reflectance. Thus, the specular reflectance merely reflects around the oven, without a substantial portion of the energy impinging on the food.

Specular reflection of energy from metallic surfaces for use in ovens is known, for example in U.S. Pat. No. 3,304,406 to King; U.S. Pat. No. 4,345,1443 to Craig et al.; U.S. Pat. No. 2,767,297 to Benson; and U.S. Pat. No. 4,455,479 to Itoh et al. These ovens specularly reflect energy, which as discussed above, reflects around the oven, without necessarily all of the energy impinging on the food. The specular reflectance is not dispersed throughout the oven to impinge onto the food. Accordingly, specular reflectance of the infrared energy by polished metal surfaces of an oven is energy inefficient.

It was generally believed that radiation with wavelengths much shorter than 1 micron is not useful in cooking or baking processes, partly because of the weaker interaction of the shorter wavelengths with the foodstuff molecules in terms of general heat transfer, and partly due to the inferior penetrating properties of such radiation. In particular, it was believed that visible light, i.e., radiation with a wavelength in a range between about 0.4 to about 0.7 micron, was not very useful in the cooking process.

However, if a sufficiently intense source of visible light radiation is used with sufficient infrared energy radiation reflection onto the food, an effective cooking apparatus results. The combination of the deeply penetrating reflected infrared radiation and the intense visible radiation establishes a temperature gradient within the interior of the foodstuff that ensures that the surface temperature of the foodstuff is hotter than the interior, and the products of the cooking, i.e., the water vapor and gases like $CO_2$, are quickly driven to the surface and out of the foodstuff. This process results in a very rapid and efficient cooking of the food.

Using infrared radiation to cook food has a number of significant advantages. The cooking process is very fast. Bakery products, for example, can be baked 5 to 10 times faster than ovens that rely on conventional convection and conduction processes. The quality of the cooking process is enhanced for many foodstuffs. Vegetables are cooked so fast that they are virtually steamed in their own water vapor, leaving them hot, but with very little loss of any of their nutritive values.

The reflectance efficiency of a material composition is dependent on several factors. These factors include the particle size of the reflecting particles and the volume fraction or coverage over the surface of the material composition. An optimum particle size and volume fraction will optimize the reflectance in the desired wavelength. Thus, it is desirable to increase the particle size and increase the volume fraction so as to increase the reflectance of the material composition.

The reflectance efficiency of a certain irradiation wavelength is dependent on three primary factors. These factors are: 1) a difference in the refractive index of the high index scattering particles and the low index surrounding medium, i.e., the higher the difference between the scattering particles and the medium the better; 2) an optimum particle size, typically about ⅓ to ½ the subject wavelength; 3) and a volume fraction of the scattering particles, high enough to provide a required number of scatterers optimally spaced within the surrounding medium, thus effecting the refraction, diffraction and reflection.

Enamels contain oxide particles, for example, white enamels Q0808A, XT1056-4, T1363 and XT 1032 of the Ferro Corporation all contain oxides. These enamels comprise a white enamel with at least one of recrystallized and mill added Anatase $TiO_2$. However, these enamels are not acceptable infrared reflectors because the size and amount or volume fraction of the Anatase $TiO_2$ particles do not provide a sufficient degree of reflectance. Accordingly, even though these enamels contain Anatase $TiO_2$, they are not suitable for infrared heating, and there is a significant degree of energy loss.

Anatase $TiO_2$ is normally precipitated out of the enamel at a firing condition, for example 1500–1550° F. for 3–10 minutes. Anatase $TiO_2$ has a size less than about 0.5 $\mu$m, and normally about 0.2 $\mu$m. The state of the art white enamel with Anatase $TiO_2$ crystals has a reflectivity of about less than $\leq 70\%$. This is not sufficient for efficient heating by infrared energy, since the reflectivity is low and the food will not heat quickly, thus resulting in a waste of energy. At this size, Anatase $TiO_2$ is optimum for the desirable white color in enamels, caused by the efficient diffuse reflection of the visible spectrum of radiation. However even though an enamel contains Anatase $TiO_2$, which reflects some heat and has desirable cleansing withstanding characteristics, it will not efficient for reflecting infrared energy to heat food, due to particle size.

SUMMARY OF THE INVENTION

Accordingly, it has been determined that it is desirable to provide a reflective enamel composition that overcomes the above described, and other deficiencies. The enamel composition, which can effectively and efficiently reflect visible to infrared energy, is capable for use in ovens that use visible to infrared energy heating.

As embodied in the invention, it is desirable to provide an infrared energy reflecting enamel composition, which comprises a binder and high reflecting non-absorbing metal oxide particles, where the reflectivity of the infrared energy reflecting enamel composition is at least 80% in an infrared energy having a wavelength range in a range from about 0.6 to about 5.0 $\mu$m. The enamel composition also diffusely reflects infrared energy.

Further, it is also desirable to provide a method for providing an energy reflecting enamel composition. The method comprises steps of providing a binder; and forming high reflecting non-absorbing metal oxide particles for the enamel composition. The method of providing results in an energy reflecting enamel composition with a reflectivity of at least 80% in an infrared energy range between about 0.6 to about 5.0 $\mu$m.

Also, it is desirable to provide an apparatus for heating food. The apparatus comprises at least one internal surface and an infrared energy reflecting enamel composition provided on the at least one internal surface of the apparatus. The infrared energy reflecting enamel composition comprises a binder; and high reflecting non-absorbing metal oxide particles, where the reflectivity of the infrared energy reflecting enamel composition having a wavelength in a range from about 0.6 to about 5.0 $\mu$m, and the infrared energy reflecting enamel composition diffusely reflects infrared energy.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE EMBODIMENTS

A material's reflectance is dependent on several factors, including size of reflecting particles, for example oxide particles, volume fraction of the reflecting particles over the surface of the material, and a difference in the refractive index of high index scattering particles. The larger the size and volume fraction of oxide particles in the material, the greater the reflectance for the material. Thus, it has been determined that it is desirable to increase the particle size and the volume fraction of reflecting oxide particles in the material to increase the reflectance of the material.

The reflecting oxide particles in the enamel composition may be metal oxide particles. Metal oxide materials, for example such as titanium oxide ($TiO_2$), zinc oxide (ZnO), zirconium oxide ($ZrO_2$), antimony oxide ($Sb_2O_3$) and compounds thereof, are effective infrared energy reflectors. The above list of materials is merely exemplary and is not meant to limit the invention in any way. The invention is intended to cover other metal oxide materials that reflect infrared energy and within the level of ordinary skill in the art.

The above metal oxides and their compounds (hereinafter the metal oxide materials) are especially effective reflectors for energy with a wavelength range between about 0.04 to about 5.0 $\mu$m, which are wavelengths emitted by infrared energy sources commonly used in rapid cooking ovens. Further, metal oxides diffusely reflect and disperse visible to infrared energy, to efficiently and effectively heat food in an oven. Infrared energy sources for ovens include, but are not limited to, lamps, such as quartz halogen lamps.

Figure 1:
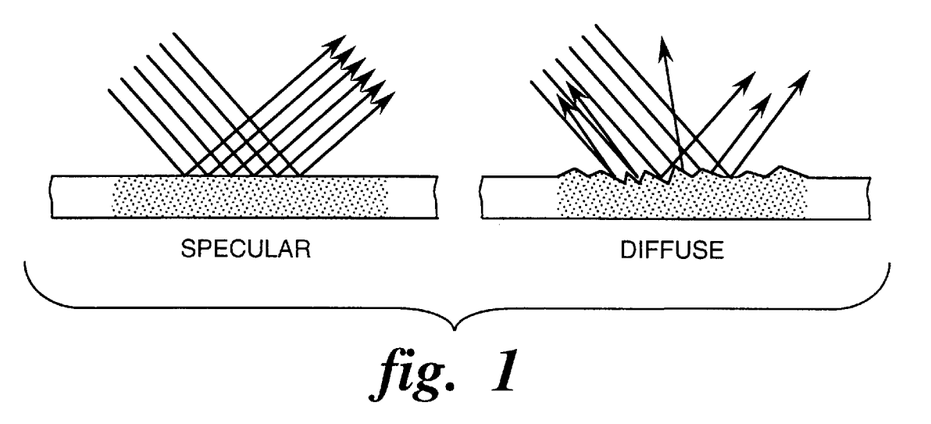
FIG. 1 is an illustration of specular versus diffuse reflectance.

The reflecting metal oxide particles are incorporated in the material to reflect visible to infrared energy. However, in addition to reflecting the infrared energy, reflecting oxide particles also diffuse and disperse the energy, when compared to a direct "angle in equals angle out" specular reflectance. Thus, diffused energy reflectance impinges more energy on food, compared to a specular reflection. The difference in specular versus diffused reflection is illustrated in FIG. 1.

The reflectance of the above metal oxide materials, and other such materials in an enamel, is dependent on at least the volume fraction and particle size of the reflecting particles in an enamel composition. To avoid a waste of energy, and consequentially resources as a result of poor reflectance, it has been determined that it is desirable to increase the volume fraction and particle size, and to increase the reflectance of the enamel. This is done at least by providing a higher volume fraction of the reflective particles in the enamel composition, and increasing the reflecting particle size in the enamel composition.

Infrared reflectance for conventional enamel compositions is about $\leq 70\%$. This is not for efficient and effective infrared heating because it wastes too much energy. It has been determined that a diffuse reflectance value of at least about 80% is desirable for efficient and effective infrared heating, especially when compared to conventional enamels. More preferable, a reflectance value of greater than about 85% is desirable. Even more preferable, a reflectance of about 90% or more is desired due to its efficiency. The increased efficiency greater than about 80% will avoid a significant loss of energy, and is thus desirable.

The reflective enamel composition, as embodied in the invention, is an enamel coating applied over at least one inner surface of an oven, for example as a cover coat on a ground coat. Alternatively, the reflective enamel composition could be incorporated into a base enamel, otherwise known as a ground coat, that is formed on an inner surface of the infrared cooking oven. The following description will be directed to a composition for a coating for an inner surface of an oven. However, this explanation is merely exemplary, and is not intended to limit the invention in any way. It should be readily clear to one of ordinary skill in the art that the coating described hereinafter can be used as an enamel that is directly placed on inner surfaces of an infrared cooking oven, where the oven may comprise one or more ground coats.

Enamel compositions comprise at least a frit or glass that includes a binder and oxides; mill additives, such as clay; and other materials, for among other properties, thickness, color, appearance, electrolytes and coloring agents. Oxides in the frit may be such as, but not limited to $Na_2O$, $K_2O$, $Si_2O$ and $TiO_2$, and are naturally occurring in the frit. Alternatively, these oxides can be added to the frit during preparation.

The metal oxide particles in an enamel, at least in part, provide reflectance of visible to infrared energies. These metal oxide particles are normally metal oxide particles, and can be selected from the group comprising, for example, titanium oxide, zinc oxide, zirconium oxide, antimony oxide or compounds thereof. However, the above list is merely exemplary and is not meant to limit the invention in any way.

Figure 2:
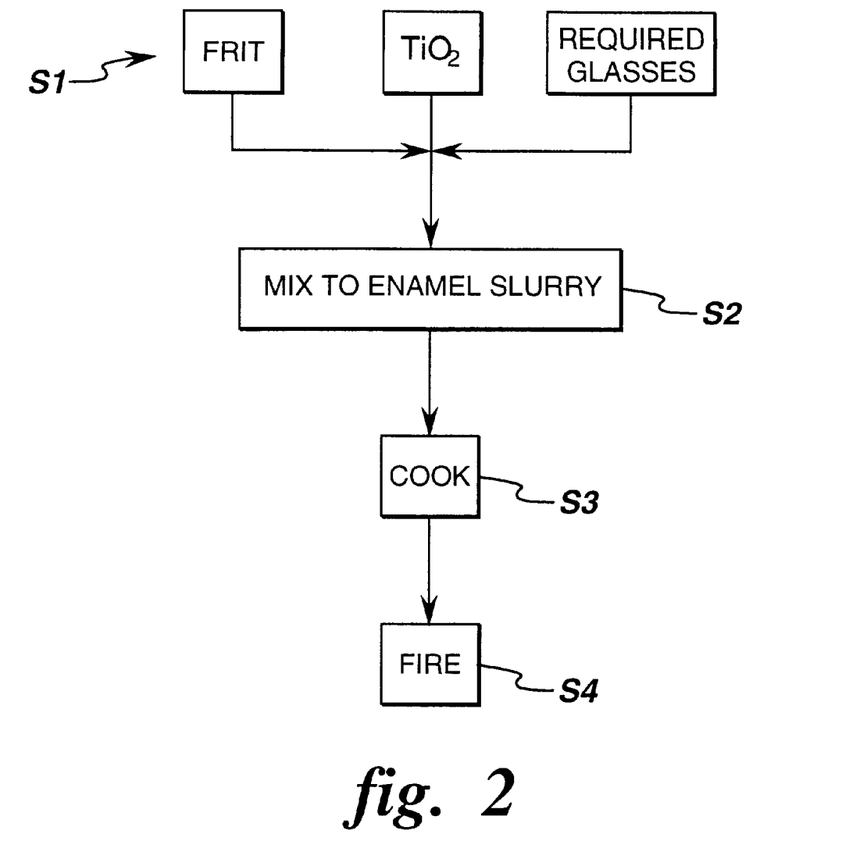
FIG. 2 is a flow chart illustrating formation of conventional enamels.

FIG. 2 is a flow chart illustrating the formation of a conventional enamel. At step S1, the individual components, such as a glass or frit, which includes oxides, mill additions and other components are provided. In step S2, the components provided in step S1 are mixed together to provide an enamel slurry.

Next, the enamel slurry is coated on an appropriate substrate in step S3. Then in step S4, the coated enamel composition and substrate is fired, so as to densify, harden and glassify the enamel composition, as is known in the art.

Figure 3:
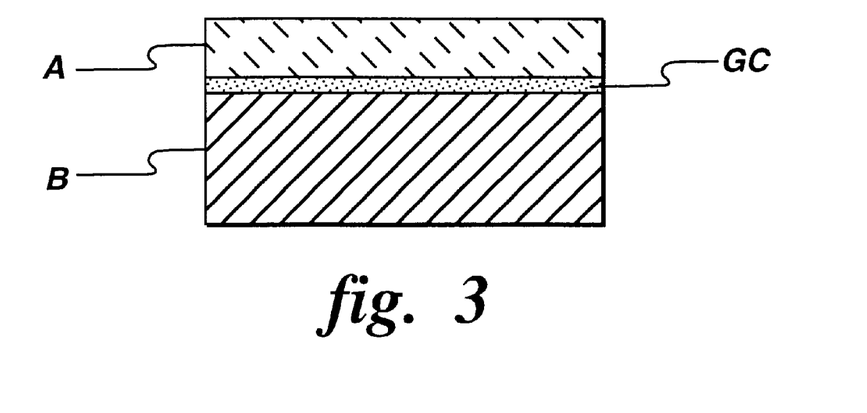
FIG. 3 is a side schematic of a fired enamel on a substrate.

An enamel composition A on a substrate B is illustrated in FIG. 3. A ground coat GC, if desired, can be provided on the substrate B as is known in the art. Firing of the enamel composition A, ground coat GC (if provided), and substrate B results in a smooth glassified hardened enamel surface, as a result of the enamel composition A softening and flowing over the substrate B.

Figure 4:
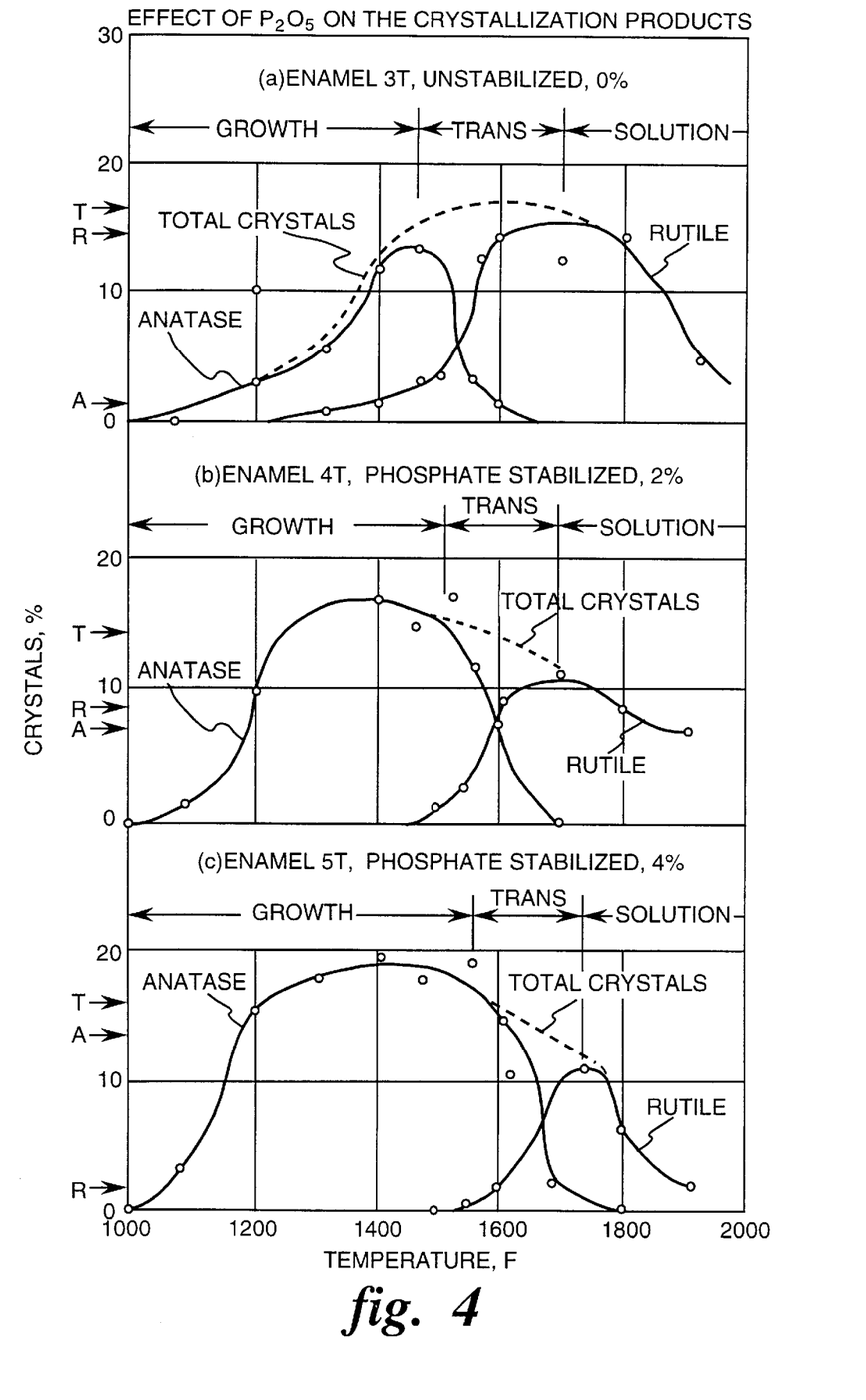
FIG. 4 is a graph illustrating crystal percentage versus temperature for the crystallization of $TiO_2$ in an enamel composition.

FIG. 4 illustrates graphs of weight percent of crystallized $TiO_2$ versus temperature for a phosphate-stabilized (4% P2O5) enamel. The graphs illustrate the conversion of $TiO_2$ from its Anatase phase to it Rutile phase. As is illustrated, the Rutile phase of the crystallized $TiO_2$ has a smaller weight percentage compared to the Anatase phase. While at first glance this may appear to be contrary to a Rutile phase of $TiO_2$ having a higher infrared reflectance, as discussed, Rutile $TiO_2$ has a larger particle size than Anatase $TiO_2$. Accordingly, an enamel with Rutile $TiO_2$ has a higher reflectivity than Anatase $TiO_2$ because of its increased particle size.

Therefore, it is desirable to increase the particle size of an enamel to increase the visible to infrared reflectance of the enamel composition. Accordingly, the invention provides for increasing a reflectance of enamel compositions by increasing at least one of the volume fraction and particle size of reflecting oxide particles in an enamel composition.

As discussed above, conventional enamels contain metal oxides, such as $TiO_2$. These $TiO_2$ particles are normally and mostly Anatase $TiO_2$. Anatase $TiO_2$ has a reflective index in a range of only about 2.4 to about 2.5 and a particle size in a range of about 0.2 to about 0.3 $\mu$m. Therefore, an enamel with Anatase $TiO_2$ does not possess a sufficient size to adequately or efficiently reflect infrared energy for heating, i.e., a reflectance greater than 80%.

However, Rutile $TiO_2$ has a higher reflective index and a larger particle size, i.e. greater than about 0.2 $\mu$m, compared to Anatase $TiO_2$. Rutile $TiO_2$ has a reflective index in a range between about 2.65 to about 2.75 and a particle size of up to about 2.75 $\mu$m. Accordingly, Rutile $TiO_2$ will exhibit a higher reflectance of infrared energy, and thus will act as a suitable reflective particle for enamels, when compared to Anatase $TiO_2$.

Acceptable infrared reflector compositions for enamels can be formed in several ways, as embodied the invention to provide an infrared energy reflecting enamel composition comprising a binder; and high reflecting non-absorbing metal oxide particles, where the reflectivity of the infrared energy reflecting enamel composition is at least 80% in an infrared energy having a wavelength in a range from about 0.6 to about 5.0 $\mu$m, and the enamel composition diffusely reflects infrared energy. For example, metal oxide particles, for example Rutile $TiO_2$, can be "grown" or recrystallized from, for example, Anatase $TiO_2$, in the enamel composition to enhance the reflectivity of the enamel composition. The Rutile $TiO_2$ particles are recrystallized and precipitated by heating an enamel for a longer period of time and at a higher temperature, compared to conventional enamel compositions.

Therefore, it has been determined to convert the normally occurring Anatase $TiO_2$ into the desirable infrared reflecting Rutile $TiO_2$ in an enamel, to increase the reflectance of the enamel. Further, it has been determined that optimizing firing conditions for an enamel will recrystallize the $TiO_2$ from Anatase $TiO_2$ to Rutile $TiO_2$. At least one of the firing conditions should exceed than the firing conditions for a conventional enamel. For example, the temperature for firing should be higher that a range of about 1500 to about 1550° F. and with the firing period remaining the same. Alternatively, the firing period is for a period longer than about 3 to about 10 minutes, with the firing temperature remaining approximately equal. This will be sufficient to recrystallize the Anatase $TiO_2$ to Rutile $TiO_2$. Alternatively, one of the Further, separated recrystallized and precipitated Rutile $TiO_2$ particles, as discussed above, can be blended into a binder system of an enamel composition, to enhance the reflectivity of the enamel composition. The blended composition with recrystallized and precipitated Rutile $TiO_2$ can be provided on any appropriate substrate, by any method, for example by a dry or wet process, as is known in the art. This provides a high volume fraction and large size particle, Rutile $TiO_2$, in the enamel composition.

Figure 5:
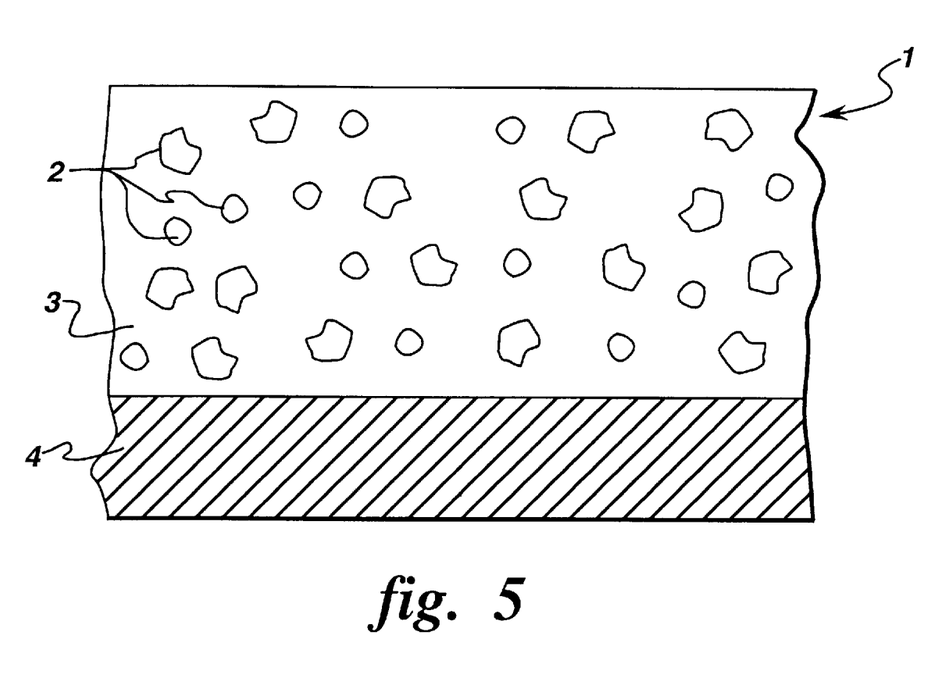
FIG. 5 is a perspective view of a first preferred embodiment of an energy reflecting enamel composition, in accordance with the invention.

Further as embodied in another aspect of the invention, the reflectance of high reflective infrared reflecting oxide particles in an enamel composition may be enhanced by placing separated and recrystallized oxide particles, for example, Rutile $TiO_2$, into an enamel composition, as illustrated in FIG. 5. The enamel composition 1 comprises Rutile $TiO_2$ particles 2. The Rutile $TiO_2$ particles 2 can be prepared, as discussed above by "growing", recrystallizing and precipitating. The Rutile $TiO_2$ particles are then ground out into separate Rutile $TiO_2$ particles, and sorted. The Rutile $TiO_2$ particles 2 are then placed in the enamel composition, such as as a mill addition.

Reflectance of the enamel composition is also enhanced by placing reflecting particles, for example, Rutile $TiO_2$ particles (as prepared above), into a glass or frit, which is saturated to its saturation level with $TiO_2$. The enamel is saturated with soluble $TiO_2$ particles, either Anatase $TiO_2$ or Rutile $TiO_2$. The resultant enamel composition, including Rutile $TiO_2$ in the glass saturated with soluble $TiO_2$, either Anatase $TiO_2$ or Rutile $TiO_2$ can be applied to a substrate by any appropriate process, for example a wet or dry process. Thus, the resultant infrared reflecting enamel composition comprises reflecting $TiO_2$ particles, and provides the enamel composition with an enhanced reflectance.

An enamel composition is formulated to optimize precipitation of $TiO_2$ as Rutile $TiO_2$ particles to enhance its reflectance. The formulation of the enamel for optimization of precipitation of $TiO_2$, as Rutile $TiO_2$, particles can comprise, but limited to, at least one of removing and lowering a phosphate composition in the enamel.

Further, an enamel composition's reflectance is enhanced by the addition of further enamel constituents, which promote the recrystallization and growth of $TiO_2$ into Rutile $TiO_2$. The further enamel constituents that are added to the enamel, may be further amounts of those constituents already within the enamel composition. Alternatively, these further enamel constituents, which promote the recrystallization and growth of $TiO_2$ into Rutile $TiO_2$, may be those that are not normally present in the enamel. Thus, the resultant infrared reflecting enamel composition will comprise precipitated Rutile $TiO_2$ particles, and provide the enamel composition with enhanced reflectance.

Moreover, an enamel composition includes Rutile $TiO_2$ particles in a preferred range size, for example, in a range between about 0.2 to about 2.5 $\mu$m, added to a high temperature, non-adsorbing binder, preferably in solution. While a high temperature, non-adsorbing binder may contain some amounts of $TiO_2$ in solution, the amount of the $TiO_2$ in solution is normally at a minimum solubility. Rutile $TiO_2$ particles, in the preferred range size between about 0.3 to about 2.5 $\mu$m, are added to a high temperature, non-adsorbing binder, preferably in solution, at an optimum volume percent. The resultant enamel composition can be applied to a substrate by any appropriate process, for example, a wet or dry process, as is known in the art. If the dry process is preferred, the solution is first dried and the resultant enamel is ground, sorted, if needed, and used in a conventional dry process.

High refractive index, enlarged non-absorbing particles are coated with a glassy coating to enhance the reflectivity of the enamel composition, in the invention. The glassy coating comprises a mixture of at least one of alkali/alkaline earth silicate/borates, phosphates, and flourine. The glassy coating comprise nucleation and growth aids. These nucleation and growth aids include, for example, ZnO, $CeO_2$ and others, as known in the art. The high refractive index, enlarged, non-absorbing particles, which are coated with a glassy coating, can be applied by either the wet or dry processes, as known in the art.

Rutile $TiO_2$ as described above to enhance the reflectivity of an enamel composition, are produced by optimizing firing conditions, as discussed above, to recrystallize and precipitate Rutile $TiO_2$. The fired white enamel is then ground or milled, and sorted to separate the Rutile $TiO_2$ particles. Alternately, the Rutile $TiO_2$ particles may be obtained by purifying naturally occurring minerals containing Rutile $TiO_2$.

The binder system or binder phase 3, as embodied in the invention, comprises binder phases as known in the art. These comprise, for example, mixed alkali silicate, mixed alkali borosilicate, suitable glass compositions, including precursors of the required oxides, such as at least one of nitrates, hydroxides, chlorides, alkoxides, and carboxylates. However, this listing is merely exemplary and is not meant to limit the invention in any way. Any appropriate binder system or binder phase for enamels can be used.

An example of an application of an enamel, will now be discussed. However, this is merely exemplary and is not meant to limit the invention in any way. For example, Rutile $TiO_2$ particles can dispersed into a sodium and potassium silicate binder solution, into which boric acid is dissolved. The binder system or binder phase can be the same binder system or binder phase that is used as the glass or frit, for example as in a conventional white enamel.

The binder system or binder phase is initially presented as a liquid mixture, for a wet process, and Rutile $TiO_2$ particles can dispersed into a sodium and potassium silicate binder solution, into which boric acid is dissolved. This then forms a slurry. This slurry has a viscosity permitting it to be coated onto a prepared substrate, by any appropriate process known in the art.

After coating the slurry onto a substrate, for example a substrate that may or may not have been coated with a ground coat, the slurry is fired or sintered at a temperature in the approximate range of 750–800° C. This sinters the glass phase into an impervious enamel coating, as is known and desirable in the art. The Rutile $TiO_2$ particles then act as an efficient and effective infrared energy reflector. Thus, the enamel can be used as a coating for an oven that uses infrared energy.

The binder phase or precursor phase can be any appropriate known binder phase or precursor phase or solution, such as for example, silicate solution or other precursor solutions, such as nitrates, hydroxides, alkoxides, or carboxylates. However, this list is not meant to limit the invention in any way. Any binder phase or precursor phase within the level of skill in the art is within the scope of this invention.

By providing the metal oxide particles having an appropriate enlarged size, an enamel with a high volume fraction of metal oxide particles, especially when compared to conventional enamels, can be provided. For example, if a mixture of $TiO_2$ particles with approximately about 80% of the particles having a size in a range between about 0.5 to about 5.0 $\mu$m, and approximately about 20% of the particles having a size less than about 0.5 $\mu$m, an effective and efficient infrared energy reflective enamel coating with a high volume fraction of $TiO_2$ particles results.

The enamel composition may also comprise additives of infrared reflecting powders of other materials to enhance the reflectance of the enamel. Further, it is also possible to add one or more organic binders such as but not limited to, methyl/cellulose, to the enamel during formation. The organic binder will assist in sintering, and provide a temporary binding during sintering.

A specific example of an infrared coating enamel composition on an oven surface for a visible to infrared heating oven is now described. It should be recognized that the following is merely an example of the invention, as is not meant in any way to limit the invention.

A Ferro enamel QA808-A was applied to a low carbon steel substrate, which is to be used in an infrared heating oven. The carbon steel substrate was, prior to the application of the enamel, pre-enameled, for example with a ground coat or white cover coat. This coated substrate was then provided with an enamel coating including Anatase $TiO_2$, to form an enamel coated panel. The coated panel was then heat treated at a temperature in the range of approximately 1520–1600° F. for approximately four minutes. This heat treating formed a recrystallized $TiO_2$ coating, so that a majority of the $TiO_2$ transformed into Rutile $TiO_2$. Thus, the enamel had a sufficient particle size and volume fraction to be an efficient and effective reflector of infrared energy, especially for use in ovens.

In this example, the visible to infrared energy reflectivity was approximately greater than about 80% for a nominal $TiO_2$ of about 20% by weight. The percentage of $TiO_2$ is normally kept at or below 20% by weight since $TiO_2$ percentages higher than that may tend to separate from the binder. Alternatively, $TiO_2$ percentages higher than that may tend to separate from the precursor solution. Also, a color of the enamel may be adversely effected by a $TiO_2$ percentage over about 20% by weight.

Figure 6:
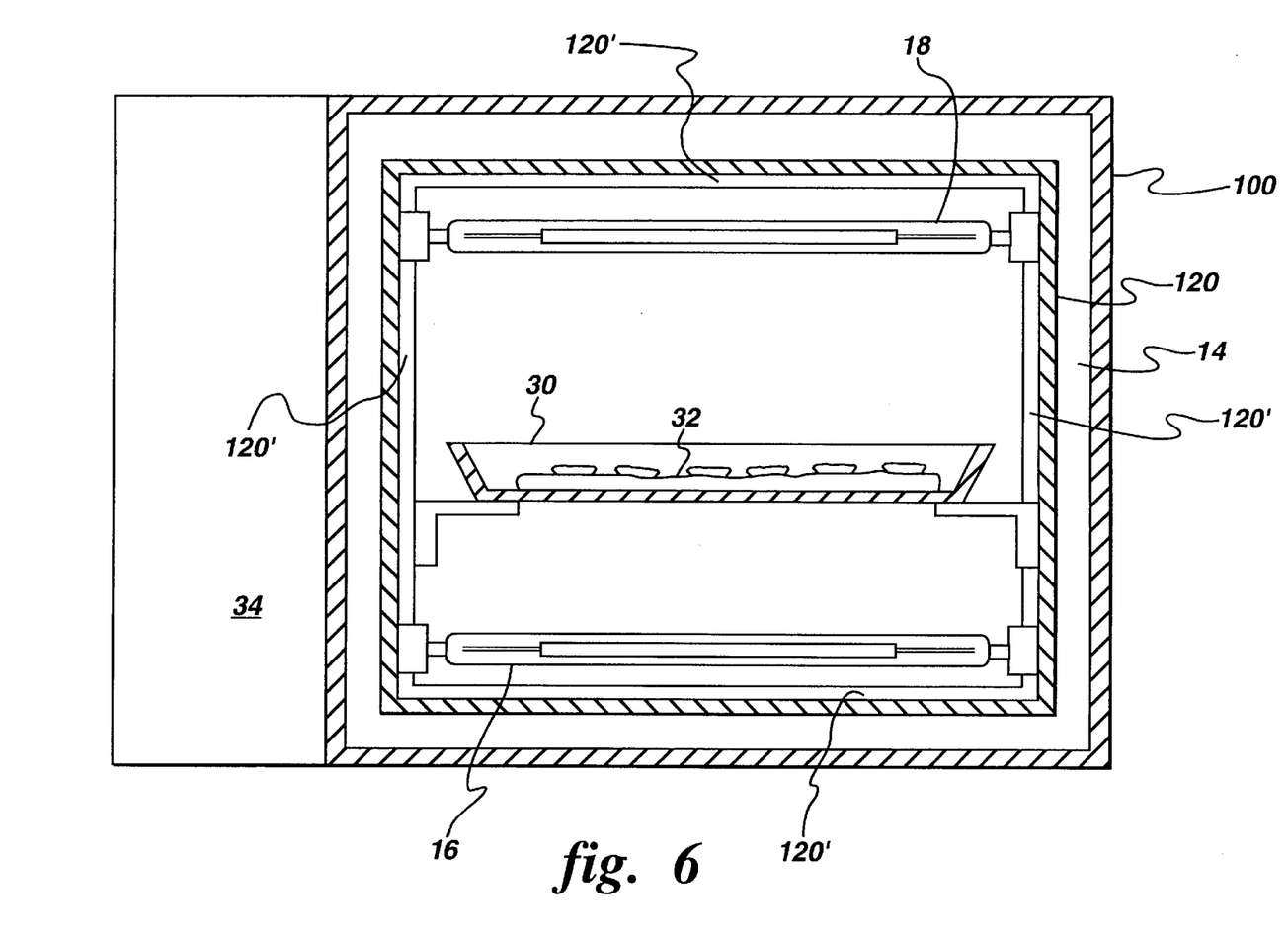
FIG. 6 is a side cross sectional illustration of an oven provided with reflective enamel composition, in accordance with the invention.

FIG. 6 is a front cross section of an oven provided with an enamel coating prepared as in the invention. The oven in FIG. 6 includes an outer enclosure 100. The enclosure has an inner wall 120 coupled to the outer wall 100. Ordinarily, an insulating layer 140 is formed between the outer enclosure 100 and the inner wall 120. Because of the inherent speed of the cooking cycle, the insulating layer 140 may be a layer of air.

The energy for cooking is supplied by lower radiation heating lamps 16 and upper radiation heating lamps 18. These lamps are generally any of the quartz body, tungsten-halogen lamps commercially available, e.g., 1.5 KW 208 V quartz-halogen lamps. The oven can utilize any number of lamps. At least one inner surface 121 of the inner wall 120 is provided with an enamel composition, as discussed above, to achieve an efficient and effective infrared energy reflecting surface 121. Thus, the surface 121 will effectively disperse the infrared energy to the food to be heated. A control circuit 34, shown as a circuit block, controls the operation of lamps 16 and 18.

The lamps 16 and 18 may produce very high intensity visible and infrared radiations. The use of both high intensity visible and infrared radiations provides a very rapid method of high-quality cooking and baking. The radiant energy from the lamps 16 and 18 radiates from the bulb in all directions. A portion of the energy radiates directly onto the food item 32. The remainder of the energy will be diffusely reflected off the enamel 121 on the metal inner wall 120 and strike the food item 32 for a more efficient cooking.

While the embodiments described herein are preferred, it will be appreciated from the specification that various combinations of elements, variations or improvements therein may be made by those skilled in the are that are within the scope of the invention.

What is claimed is:

1. An infrared energy reflecting enamel composition comprising:
    a binder; and
    high reflecting non-absorbing metal oxide particles, wherein the reflectivity of the infrared energy reflecting enamel composition is at least 80% for an infrared energy having a wavelength in a range from about 0.6 μm to about 5.0 μm, and the enamel composition diffusely reflects infrared energy.

2. The composition according to claim 1, wherein the reflectivity of the infrared energy reflecting enamel composition is at least 85% for an infrared energy having a wavelength in a range from about 0.6 μm to about 5.0 μm.

3. The composition according to claim 1, wherein the reflectivity of the infrared energy reflecting enamel composition is at least 90% for an infrared energy having a wavelength in a range from about 0.6 μm to about 5.0 μm.

4. A composition according to claim 1, wherein the high reflecting non-absorbing metal oxide particles are selected from the group consisting of:
    titanium oxide, zinc oxide, zirconium oxide, antimony oxide, sulfides, halides and compounds thereof.

5. A composition according to claim 1, wherein the high reflecting non-absorbing metal oxide particles comprise titanium oxide $TiO_2$ particles.

6. A composition according to claim 5, wherein the titanium oxide particles comprise Rutile $TiO_2$ particles.

7. A composition according to claim 5, wherein the $TiO_2$ particles further comprise a coating, the coating comprising a binder composition.

8. A composition according to claim 7, wherein the binder composition is selected from the group consisting of;
    mixed alkali silicate; mixed alkali borosilicate; and glass compositions comprising precursors of oxides, such as nitrates, hydroxides, chlorides, alkoxides, and carboxylates.

9. A composition according to claim 5, wherein the $TiO_2$ particles comprise Rutile $TiO_2$ particles coated with a binder composition.

10. A composition according to claim 9, wherein the binder composition is selected from the group consisting of:
    mixed alkali silicate; mixed alkali borosilicate; and glass compositions comprising precursors of oxides, such as nitrates, hydroxides, chlorides, alkoxides, and carboxylates.

11. A composition according to claim 5, wherein the $TiO_2$ particles comprise Anatase $TiO_2$ coated with a binder composition.

12. A composition according to claim 11, wherein the binder composition is selected from the group consisting of:
    mixed alkali silicate; mixed alkali borosilicate; and glass compositions comprising precursors of oxides, such as nitrates, hydroxides, chlorides, alkoxides, and carboxylates.

13. A composition according to claim 1, further comprising a cooking apparatus comprising at least one internal surface, wherein the infrared energy reflecting enamel composition is provided on the at least one internal surface of the apparatus.

14. A composition according to claim 1, wherein the high reflecting non-absorbing particles comprise Rutile $TiO_2$ particles having a particle size in the range between about 0.2 to about 2.5 μm, the Rutile $TiO_2$ particles obtained by firing an enamel composition for an extended period of time at an increased temperature to recrystallize and precipitate Rutile $TiO_2$.

15. A composition according to claim 1, wherein the high reflecting non-absorbing particles comprise Rutile $TiO_2$ particles and the binder comprises a glass saturated with soluble $TiO_2$ particles.

16. A composition according to claim 1, wherein the binder comprises a glass composition, the glass composition formulated to precipitate the high reflecting non-absorbing metal oxide particles as Rutile $TiO_2$ particles.

17. A composition according to claim 16, wherein the glass composition formulated to precipitate the high reflecting non-absorbing metal oxide particles as Rutile $TiO_2$ particles comprises at least one glass composition selected from the group consisting of:
    a glass composition with no phosphates and a glass composition with a low a phosphate level.

18. A composition according to claim 1, the binder further comprising additional constituents, wherein the additional constituents promote recrystallization and growth additives to recrystallize and precipitate for the high-reflecting non-absorbing metal oxide particles.

19. A composition according to claim 1, wherein the binder comprises a high temperature non-absorbing binder comprising high-reflecting non-absorbing particles and the metal oxide particles comprise Rutile TiO$_2$ in a predetermined optimum volume percentage.

20. A composition according to claim 19, the binder further comprises nucleation and growth additives to recrystallize and precipitate the Rutile TiO$_2$.

21. A method for providing an energy reflecting enamel composition comprising:

providing a binder; and forming high reflecting non-absorbing metal oxide particles for the enamel composition, where the energy reflecting enamel composition is provided with a reflectivity of at least 80% for an infrared energy having a wavelength in a range from about 0.6 μm to about 5.0 μm.

22. The method according to claim 21, wherein the binder comprises a mixture of alkali/alkaline earth silicates/borates, phosphates and fluorine.

23. The method according to claim 21, wherein the reflectivity of the infrared energy reflecting enamel composition is at least 85% for an infrared energy having a wavelength in a range from about 0.6 μm to about 5.0 μm.

24. The method according to claim 21, wherein the reflectivity of the infrared energy reflecting enamel composition is at least 90% for an infrared energy having a wavelength in a range from about 0.6 μm to about 5.0 μm.

25. A method according to claim 21, wherein the forming high reflecting non-absorbing metal oxide particles comprises:

selecting particles from the group consisting of: titanium oxide, zinc oxide, zirconium oxide, antimony oxide, sulfides, halides and compounds thereof.

26. A method according to claim 21, wherein the forming high reflecting non-absorbing metal oxide particles comprises selecting titanium oxide as Rutile TiO$_2$.

27. A method according to claim 26, wherein the forming high reflecting non-absorbing metal oxide particles further comprises:

coating titanium oxide particles with a coating of a binder composition; and selecting the binder composition from the group consisting of:

mixed alkali silicate; mixed alkali borosilicate; and glass compositions comprising precursors of oxides, such as nitrates, hydroxides, chlorides, alkoxides, and carboxylates.

28. A method according to claim 21, wherein the forming high reflecting non-absorbing metal oxide particles comprises selecting Anatase TiO$_2$ particles comprising a coating of a binder composition; and selecting the binder composition from the group consisting of:

mixed alkali silicate; mixed alkali borosilicate; and glass compositions comprising precursors of oxides, such as nitrates, hydroxides, chlorides, alkoxides, and carboxylates.

29. The method according to claim 21, wherein the forming high reflecting non-absorbing metal oxide particles further comprises selecting particles from the group consisting of sulfides and halides.

30. The method according to claim 21, wherein the forming particles further comprises recrystallizing and precipitating the high reflecting non-absorbing metal oxide particles by heat treating.

31. The method according to claim 21, wherein the forming high reflecting non-absorbing metal oxide particles further comprises at least one of providing enamel constituents and providing additives to promote precipitation of Rutile TiO$_2$ particles.

32. An apparatus for heating food, the apparatus comprises:

at least one internal surface; and an infrared energy reflecting enamel composition being provided on the at least one internal surface of the apparatus, the infrared energy reflecting enamel composition comprising:

a binder; and high reflecting non-absorbing metal oxide particles, wherein reflectivity of the infrared energy reflecting enamel is at least 80% for an infrared energy having a wave length in a range from about 0.6 μm to about 5.0 μm, and the infrared energy reflecting enamel composition diffusely reflects infrared energy.

* * * * *